United States Patent
Li et al.

(10) Patent No.: US 10,454,395 B2
(45) Date of Patent: Oct. 22, 2019

(54) POWER MANAGEMENT IN PERMANENT MAGNET SYNCHRONOUS MOTOR DRIVES

(71) Applicant: STEERING SOLUTIONS IP HOLDING CORPORATION, Saginaw, MI (US)

(72) Inventors: Haibo Li, Saginaw, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 15/804,190

(22) Filed: Nov. 6, 2017

(65) Prior Publication Data

US 2019/0140564 A1    May 9, 2019

(51) Int. Cl.
| | |
|---|---|
| H02P 6/08 | (2016.01) |
| H02P 6/28 | (2016.01) |
| B62D 5/04 | (2006.01) |
| H02P 25/022 | (2016.01) |
| H02P 25/024 | (2016.01) |

(52) U.S. Cl.
CPC ............ *H02P 6/08* (2013.01); *B62D 5/046* (2013.01); *H02P 6/28* (2016.02); *H02P 25/022* (2013.01); *H02P 25/024* (2016.02)

(58) Field of Classification Search
CPC ........ H02P 29/024; H02P 29/032; H02P 6/28; H02P 6/08; H02P 2006/045; H02P 29/027; H02P 2207/05
See application file for complete search history.

(56) References Cited

U.S. PATENT DOCUMENTS

| | | | | |
|---|---|---|---|---|
| 8,306,692 B2 * | 11/2012 | Ishishita | ............. | H01M 10/443 701/36 |
| 9,998,061 B2 * | 6/2018 | Shinohara | ............. | H02P 29/027 |
| 2002/0145837 A1 * | 10/2002 | Krefta | .................. | B60L 3/0023 361/23 |
| 2002/0195999 A1 * | 12/2002 | Kimura | .................. | B60L 58/12 320/134 |
| 2003/0094816 A1 * | 5/2003 | Kazama | .................... | B60K 6/32 290/40 C |
| 2014/0000860 A1 * | 1/2014 | Nishizawa | ............. | B60L 1/003 165/202 |
| 2016/0308475 A1 * | 10/2016 | Morii | ...................... | H02P 21/02 |
| 2016/0352276 A1 * | 12/2016 | Pramod | ............... | H02P 21/0003 |
| 2017/0096135 A1 * | 4/2017 | Kishimoto | ............. | B60L 50/51 |
| 2018/0152123 A1 * | 5/2018 | Zhang | .................. | H02P 27/085 |

* cited by examiner

*Primary Examiner* — Thai T Dinh

(57) ABSTRACT

Technical solutions are described for power management in permanent magnet synchronous machines. An example system includes a permanent magnet synchronous motor (PMSM), and a motor control system that limits supply current and regenerative current of the PMSM. The limiting includes receiving a torque command and generating a corresponding current command for generating an amount of torque based on the torque command. Further, the limiting includes determining an estimated battery current that is drawn corresponding to the current command. Further, in response to the estimated battery current exceeding a threshold, a modified torque command is generated, and a modified current command corresponding to the modified torque command is also generated. The modified current command is used to cause the PMSM to generate the amount of torque.

20 Claims, 8 Drawing Sheets

POWER MANAGEMENT IN PERMANENT MAGNET SYNCHRONOUS MOTOR DRIVES

BACKGROUND

The present application generally relates to motor control systems, and particularly to power management in permanent magnet synchronous machines.

Permanent Magnet Synchronous Machines (PMSMs) are widely used in electric drive applications owing to their high power density, superior control performance and reliability. Typically, torque control of PMSMs is performed indirectly through feedback current control typically utilizing current and position measurements. Field Oriented Control (FOC) is the most commonly used technique for current control, in which all AC signals are transformed into DC signals via a reference frame transformation. The control system is then implemented in the synchronously rotating or d/q reference frame.

SUMMARY

Technical solutions are described for power management in permanent magnet synchronous machines. An example system includes a permanent magnet synchronous motor (PMSM), and a motor control system that limits supply current and regenerative current of the PMSM. The limiting includes receiving a torque command and generating a corresponding current command for generating an amount of torque based on the torque command. Further, the limiting includes determining an estimated battery current that is drawn corresponding to the current command. Further, in response to the estimated battery current exceeding a threshold, a modified torque command is generated, and a modified current command corresponding to the modified torque command is also generated. The modified current command is used to cause the PMSM to generate the amount of torque.

According to one or more embodiments, a method for limiting a supply current and regenerative current in a motor control system includes receiving a torque command and generating a corresponding current command to generate an amount of torque according to the torque command. The method further includes determining an estimated battery current that is drawn corresponding to the current command. In response to the estimated battery current exceeding a threshold, the method includes generating a modified torque command, and generating a modified current command corresponding to the modified torque command. Further, the method includes sending the modified current command to cause a motor to generate the amount of torque.

According to one or more embodiments a motor control system includes a current generation module that receives a torque command and generate a corresponding current command to generate an amount of torque according to the torque command. Further, a battery current estimation and comparison module determines an estimated battery current drawing from a power supply for applying the current command. Further, the battery current estimation and comparison module compares the estimated battery current with a max-threshold battery current. In response to the estimated battery current exceeding the max-threshold battery current, the battery current estimation and comparison module sends a feedback factor for modifying the torque command, and in response to the estimated battery current meeting the max-threshold battery current, the current command for generating torque is sent. Further, a battery current pre-limiting module modifies the torque command using the feedback factor and send the modified torque command to the current generation module.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
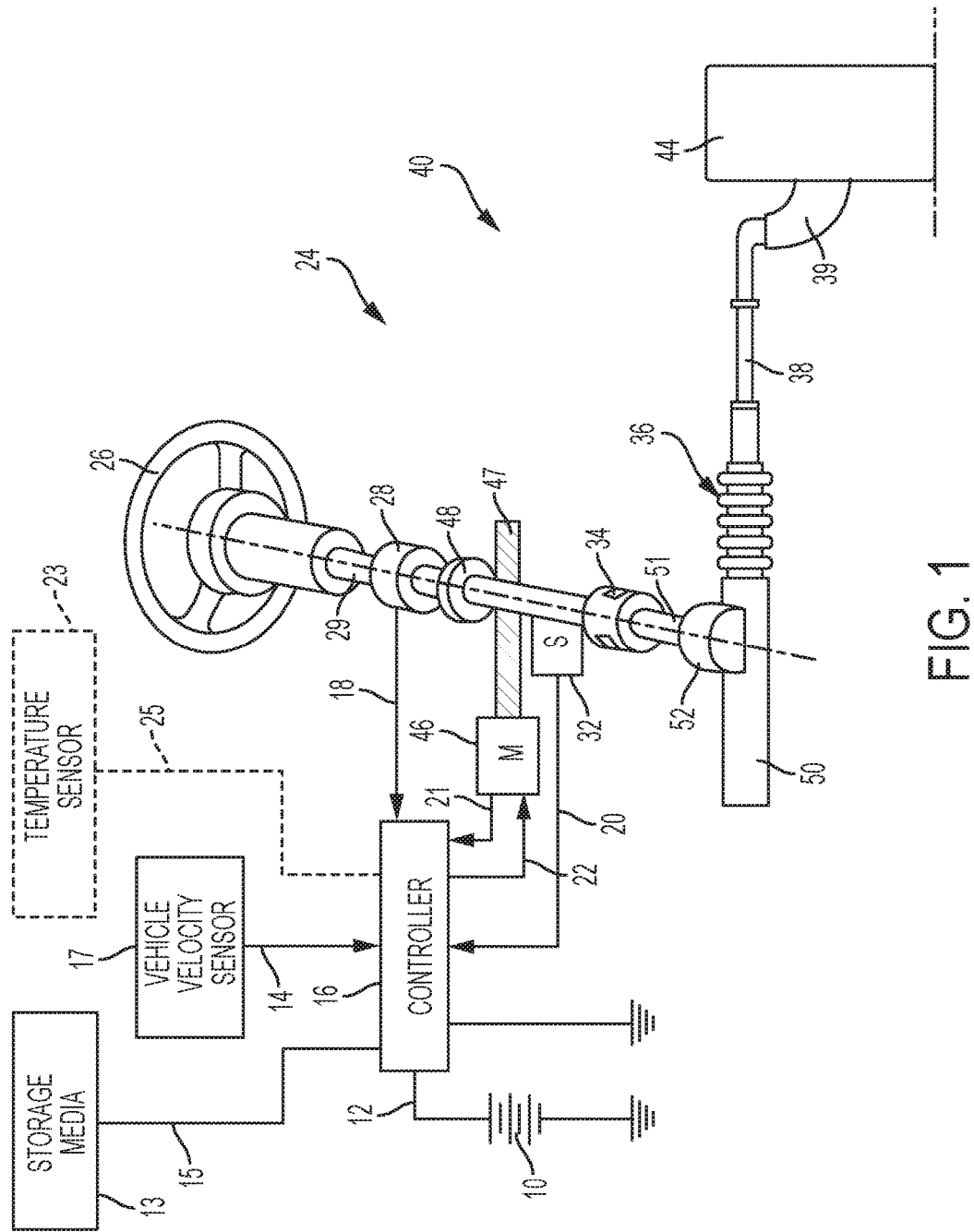
FIG. 1 depicts an EPS system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46, which could be a permanent magnet synchronous motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to, torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

In one or more examples, the technical solutions described herein facilitate power management of the electric drive portion of the EPS system, i.e. the motor control system. It should be noted that although the technical solutions are described herein using embodiments of steering system, the technical solutions are applicable to any other motor control system that is used in any other PMSM.

In a motor control system, in order to protect a voltage source of the electric drive (motor control) system, a voltage versus supply and/or regenerative current limit is typically imposed. These limits may be in the form of a table calibrated offline or an online continuously changing limit that is sent to the motor control system. Given this supply and/or regenerative current limit, the motor current command is modified to ensure that the system does not draw any more supply current or does not feed more regenerative current than specified, so that the power supply is protected. In specific examples of a motor control system being used in the case of automotive applications, such as a steering system, the power supply is a vehicle battery.

The technical solutions described herein address the technical challenge of limiting the supply and regenerative currents in the motor control system. In one or more examples, the technical solutions facilitate actively limiting both the supply and regenerative currents flowing between the power supply and PMSM. The limiting scheme restricts the supply and regenerative current draw through active torque command modification and in turn also ensures complete voltage utilization. The supply and regenerative current limiting is translated to equivalent PMSM torque limiting by solving the power equations of power flow loop based on power conservation principle in the motor control system, and is implemented by online torque command modification according to maximum allowable torque under battery current constraint. The technical solutions described herein thus protect the power supply, such as a battery, from excessive discharging or charging current under all operation conditions of the PMSM drive system. Further, the technical solutions described herein are applicable to all electric drive system employing PMSMs and is not restricted to any specific application.

Figure 2:
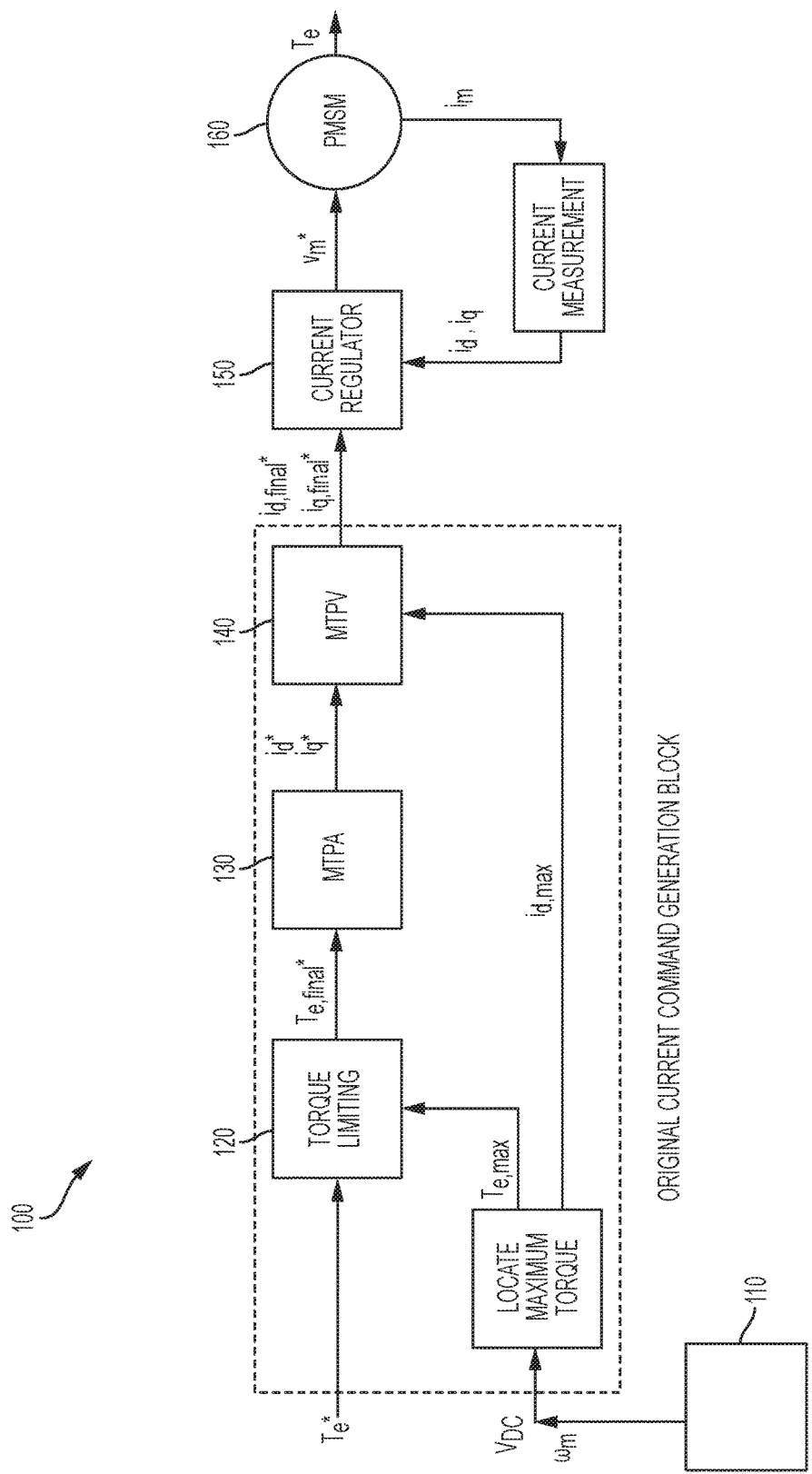
FIG. 2 depicts a block diagram of an example torque control algorithm for PMSMs.

FIG. 2 depicts a block diagram of an example torque control algorithm for PMSMs. The block diagram depicts a motor control system 100 in which for a given DC link voltage $V_{DC}$, which is derived from a battery 110, and a motor (mechanical) speed $\omega_m$, the maximum torque $T_{e,max}$ is calculated and then compared to a given torque command $T_e^*$ to generate a final torque command $T_{e,final}^*$ final within the system capability by a torque limiting module 120. The motor control system 100 thus facilitates motor torque control and motor current control. The $T_{e,final}^*$ is sent to a maximum torque per ampere (MTPA) module 130 to calculate current commands $i_d^*$ and $i_q^*$, which are sent into a maximum torque per voltage (MTPV) module 140 to check if the corresponding PMSM voltage $v_m$ exceeds the maximum feasible value $v_{d,final}^*$ limited by DC link voltage. If the PMSM voltage $v_m$ does not exceed $v_{m,max}$, current commands calculated by the MTPA module 130 are used as final commands $i_{d,final}^*$ and $i_{q,final}^*$ for PMSM control; otherwise, different commands $i_{d,final}^*$ and $i_{q,final}^*$ are generated by the MTPV block 140 to meet the PMSM voltage constraint. The final current commands are then sent to a current regulator 150, which ensures current tracking, and thus torque tracking. Here, 'tracking' refers to how close the output current (or torque) is to the desired current (or torque) as requested by the current command (torque command).

To protect the battery 110 from being over discharged or charged by excessive current and thereby extend the battery life, battery current limiting is performed during operation of the PMSM 110. The PMSM 160 may be the motor 26 used in the steering system 40, or any other application. As described earlier, typically look-up tables (LUT) are used to adjust the torque and current commands so that the battery current does not exceed the maximum value. A technical challenge with such an approach is that an offline calibration has to be performed for different motors and is time-consuming. Further, due to the offline nature of these techniques, the current and torque commands are not optimal since dynamically changing operation conditions of the PMSM 160 are not considered. The technical solutions described herein facilitate battery current limiting that has the capability to limit both supply current and regenerative currents at the same time, can be implemented when the PMSM 160 is online, with at least a threshold accuracy throughout the entire operation regions of the PMSM 160, and further ensures full DC link voltage utilization. The technical solutions are described further.

Figure 3:
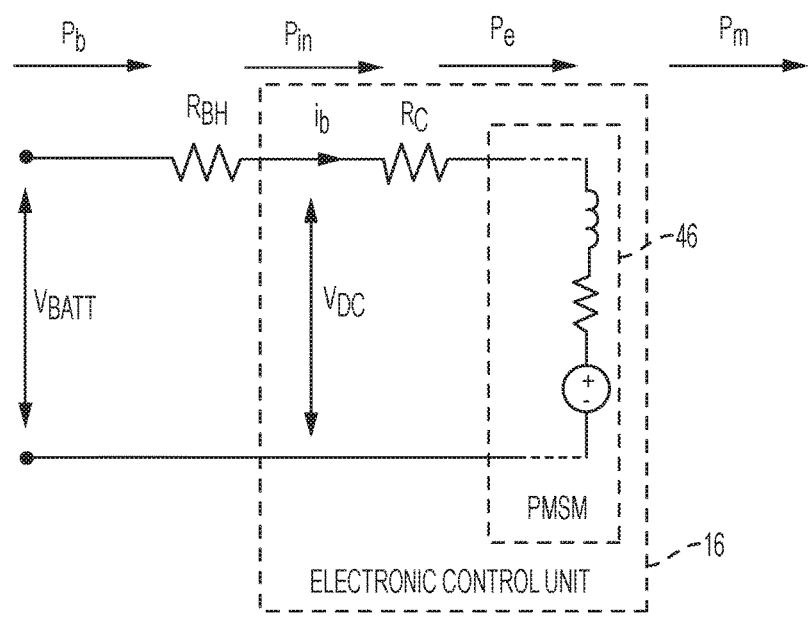
FIG. 3 depicts a power flow of a motor control system.

FIG. 3 depicts a power flow of a motor control system. The motor control system that is depicted is from the steering system 40 including the control module 16 and the motor 46, which define a voltage loop that includes the voltage across the battery 110 (not shown) and the voltage at the input of the inverter (not shown) which is then connected to the motor 46.

For a given battery voltage ($V_{BATT}$), and a measurement of the voltage input ($V_{DC}$) to the system 16, the power equations may be solved to obtain motor current limits. A supply current $I_s$ is related to the regenerative current $I_B$ as follows.

$$I_b = -I_s$$

Further, the voltage circuit model considering the battery may be mathematically expressed as follows.

$$V_{DC} = V_{BATT} - R_{BH} I_s$$

where $R_{BH}$ represents the battery harness resistance. The power balance equation of this system may be written as follows.

$$V_{DC} I_s - R_c I_s^2 = P_e$$

$$-V_{DC} I_b - R_c I_b^2 = P_e$$

where $R_c$ is the controller input resistance and $P_e$ is the electrical power input to the motor control system (or drawn by the motor control system). The expression for $P_e$ is described in detail further herein. Referring back to FIG. 3, if the PMSM operates as the motor 46, the battery current $i_b$, is the supply current drawn from the battery 110 and is considered to be a positive value; otherwise if the PMSM operates as a generator, battery current $i_b$ is a regenerative current supplied back to the battery 110, and is considered to be negative. For a given battery current limit $I_{b,max}$, if the power equations are solved to obtain the PMSM torque limit according to the power conservation principle, the power balance equation of the system may be written as $P_{in} = P_e + i_b^2 R_c$, where $P_{in}$, $P_e$, and $R_c$ and $R_c$ are input power of DC link, input electrical power of PMSM drive system, and DC link input resistance, respectively.

The voltages of DC link and battery 110 are related as follows.

$$V_{DC} = V_{BATT} - i_b R_{BH}$$

where $V_{BATT}$ and $R_{BH}$ are battery voltage and battery harness resistance, respectively.

Further, the $P_{in}$ and $P_e$ can be derived as follows.

$$P_{in} = V_{DC} i_b$$

$$P_e = T_e \omega_m + P_{loss}$$

where $T_e \omega_m$ and $P_{loss}$ are PMSM output electrical power and losses, respectively. The electrical losses include inverter loss, winding loss, core loss and stray losses in the PMSM.

Out of all the loss components, the winding loss is dominant. Consequently, the electromagnetic torque may be written as follows.

$$T_e = \frac{P_e - P_{loss}}{\omega_m} = \frac{P_{in} - i_b^2 R_C - P_{loss}}{\omega_m} = \frac{V_{DC} i_b - i_b^2 R_C - P_{loss}}{\omega_m}$$

If battery current limits are to be considered in the typical PMSM control algorithm, the torque command has to be modified accordingly. Specifically, if a maximum battery supply or PMSM regenerative current $I_{b,max}$ is added as PMSM control constraint, the maximum allowable torque will be $$T_{b,max} = \frac{V_{DC} I_{b,max} - I_{b,max}^2 R_C - P_{loss}}{\omega_m}$$

The technical challenge here is that the loss component $P_{loss}$ in this $T_{b,max}$ calculation formula is influenced by motor current $i_m$, which retroactively influences $T_{b,max}$ sent into the motor control algorithm. The technical solutions described herein address this technical challenge by combining a torque command pre-limiting with iterative updating method to eliminate or minimize the coupled interaction between torque and motor current.

Figure 4:
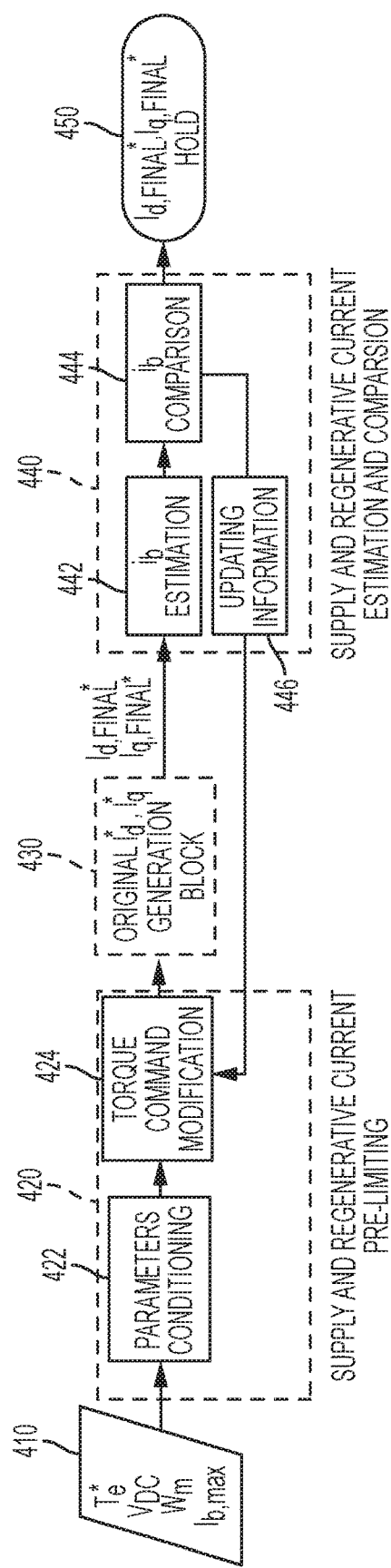
FIG. 4 depicts a flowchart of an example method for supply and regenerative currents limiting according to one or more embodiments.

FIG. 4 depicts a flowchart of an example method for supply and regenerative currents limiting according to one or more embodiments. In one or more examples, the technical solutions described herein is integrated into the PMSM control algorithm, as shown in FIG. 4, to generate current commands $i_{d,final}^*$ and $i_{q,final}^*$ to ensure supply and regenerative currents remain under pre-defined limits. The method, as illustrated, includes pre-limiting the input (supply or regenerative) current $i_b$, as shown at 420, and further estimating and comparing the $i_b$, as shown at 440. The method includes receiving input parameters, as shown at 410. The input parameters include at least the $T_e^*$, $V_{DC}$, $\omega_m$, and $I_{b,max}$.

The $i_b$ pre-limiting includes parameters conditioning and torque command modification, as shown at 422 and 424. The conditioned parameters and the modified torque command, together, are used for computing the current commands $i_{d,final}^*$ and $i_{q,final}^*$, as shown at 430.

Further, the method includes estimating the battery current $i_b$ based on the current commands $i_{d,final}^*$ and $i_{q,final}^*$, and examining if the estimated $i_b$ is within specified limit values (one value each for supply and regenerative current limits), as shown at 442 and 444. The method further includes providing a feedback updating information to the previous torque command modification step, and iterating the method until the estimated $i_b$ meets the pre-defined limits, as shown at 446. There are multiple ways to implement the $i_b$ pre-limiting and feedback loop to facilitate performing the $i_b$ limiting by torque command modification and iterative updating. The current commands that satisfy the pre-defined limits are held for forwarding to the current regulator 150 as the commands $I_{d,final}^*$ and $I_{q,final}^*$, as shown at 450.

Figure 5:
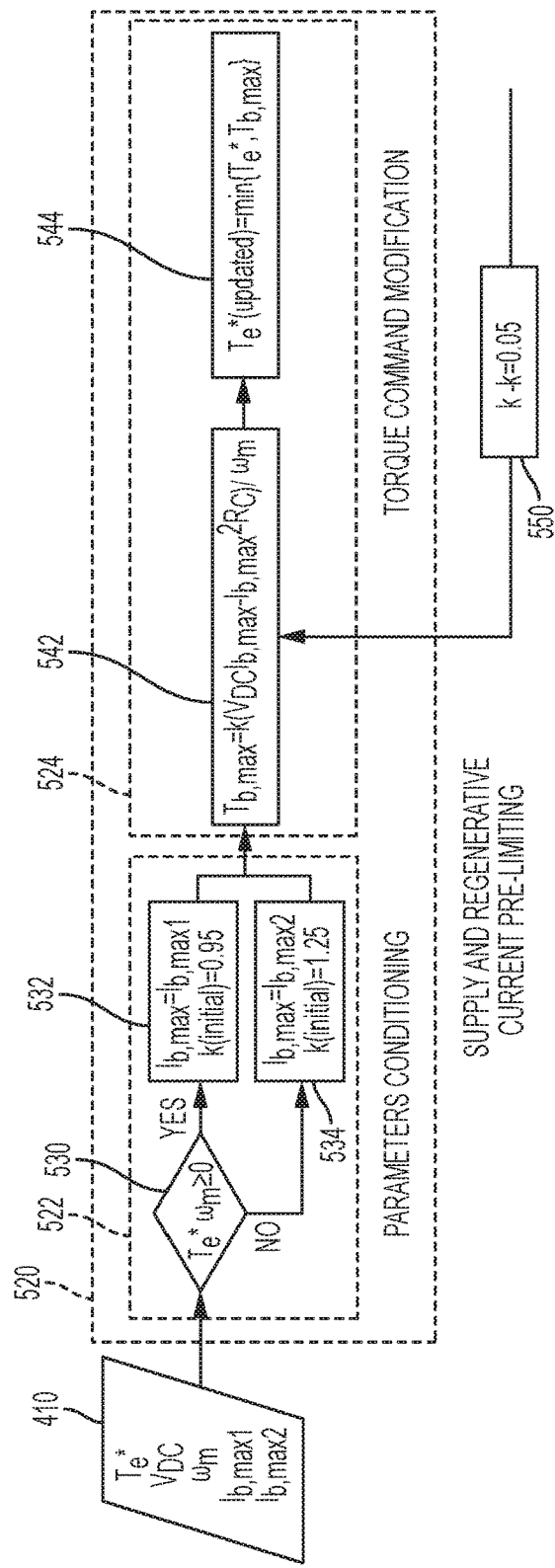
FIG. 5 depicts a block diagram of a supply and regenerative current pre-limiting module and feedback loop according to one or more embodiments.

FIG. 5 depicts a block diagram of a supply and regenerative current pre-limiting module and a part of the feedback loop according to one or more embodiments. The supply and regenerative current pre-limiting module 520 implements the parameter conditioning and torque command modification. In one or more examples, the supply and regenerative current pre-limiting module is part of the control module 16, is executed by the control module 16, or is a separate electronic circuit included in the motor control system 200. Further, in one or more examples, the supply and regenerative current pre-limiting module 520 includes separate modules—a parameter conditioning module 522 and a torque command modification module 524, among others.

The supply and regenerative current pre-limiting module 520, in one or more examples, as part of the parameter conditioning, identifies an operation mode of the PMSM 160 using the product of $T_e^*$ and $\omega_m$, as shown at 530. Based on the operation mode, the maximum supply current $I_{b,max1}$ and the maximum regenerative current $I_{b,max2}$ are used dynamically for conditioning the parameters. If the product is higher than zero, the PMSM operation mode is determined to be in motoring mode (initially), and the method includes setting $I_{b,max} = I_{b,max1}$, as shown at 532. If the product is lower than zero, the system is operating in the regenerative operation (or generating) mode, setting $I_{b,max} = I_{b,max2}$, as shown at 534. Further, a scaling factor k is used based on the product being greater than (or equal to) or lesser than zero. The scaling factor k is a torque factor that is used to reduce torque calculation dependence on loss, where the torque calculation is $$T_e = \frac{k(V_{DC} i_b - i_b^2 R_C)}{\omega_m}$$

When maximum battery current limits are considered, the maximum torque to ensure supply and regenerative current within limits can be computed, as shown at 542, as $$T_{b,max} = \frac{k(V_{DC} I_{b,max} - I_{b,max}^2 R_C)}{\omega_m}$$

After $T_{b,max}$ calculation, the original torque command $T_e^*$ is updated and replaced by the smaller value among $T_e^*$ and $T_{b,max}$, as shown at 544. Because the PMSM mechanical power under motor mode comes from the battery 110, k is less than 1 in this mode (532). Under regenerative mode, however since the power flows from the PMSM 160 to the battery 110, k is larger than 1 in this mode (534). The torque factor k is continuously updated through feedback loop until the supply and regenerative current limits are met, as shown at 550.

It should be noted that, the constant values depicted in the examples above, and/or in the FIG. 5, or in any other examples/drawing herein are examples, and can vary depending on system parameters and specific operation condition in other examples. In one or more examples, a parameter adaptive scheme is used to achieve faster convergence of the value of k during the implementation of the above method. Furthermore, the torque modification can be alternatively performed as $T_{b,max} = T_{b,max} - \Delta T$, where $\Delta T$ is a torque updating step. In other examples, alternative methods for updating the torque within the feedback loop may be used.

In one or more examples, PMSM operation has a critical region at low motor speeds (speed being below a predetermined threshold) where the product $T_e^* \omega_m < 0$, and yet the battery 110 supplies current to the system. For such a critical region, the battery current constraint given in $i_b$ pre-limiting is incorrect because the battery 110 is assumed to be charged by regenerative current which however is still supplying current. To avoid a failure in this case, in one or more examples, the method described above is modified.

Figure 6:
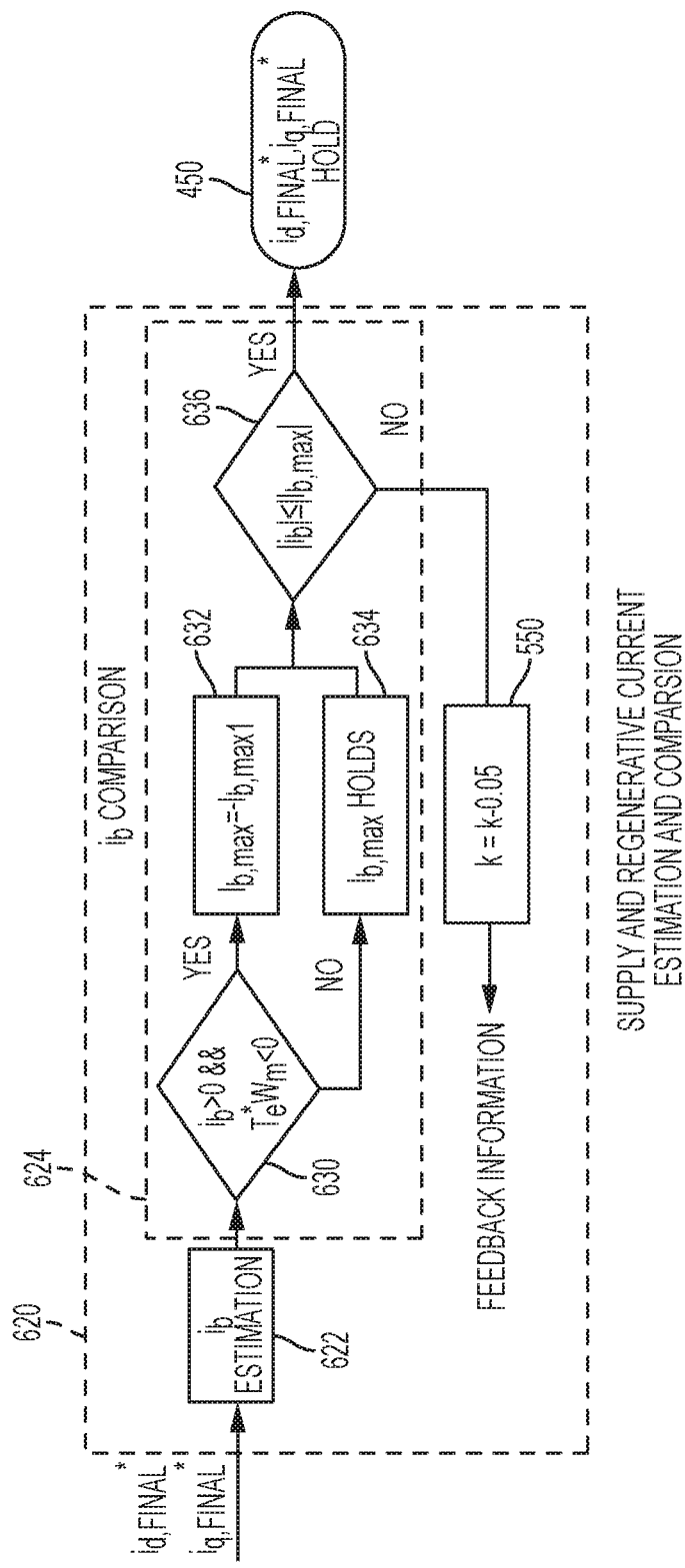
FIG. 6 depicts a block diagram of an example supply and regenerative current estimation and comparison module according to one or more embodiments.

FIG. 6 depicts a block diagram of an example $i_b$ estimation and comparison module according to one or more embodiments. In one or more examples, the $i_b$ estimation and comparison module is part of the control module 16, is executed by the control module 16, or is a separate electronic circuit included in the motor control system 200. Further, in one or more examples, the supply and regenerative current estimation and comparison module 620 includes separate modules—a battery current estimation module 622 and a battery current comparison module 624, among others.

The supply and regenerative current estimation and comparison module 620 performs one or more operations for estimating the battery current $i_b$ using the final current commands from the pre-limiting operations 520, as shown at 622. The supply and regenerative current estimation and comparison module 620 further performs one or more operations for checking if the system is operating in the critical region, as shown at 630. The battery current limits are set dynamically based on the result of the comparison. For example, the current limit is corrected as $I_{b,max} = -I_{b,max1}$ in critical region, which secures the supply current within given limit $I_{b,max1}$, as shown at 632. If the system is not operating in the critical region, the $I_{b,max}$ value is not adjusted, as shown at 634. Further, the estimated battery current $i_b$ is compared with the battery current limit $I_{b,max}$, using a modulo operator on the values, as shown at 636.

The battery current $i_b$ (during one or more iterations) may be estimated using the power equations given above. The power equation $V_{DC} i_b - R_c i_b^2 = P_e$ may be solved to obtain $i_b$ as follows.

$$i_b = \frac{V_{DC} + \sqrt{V_{DC}^2 - 4R_c P_e}}{2R_c},$$

where the input electrical power to the motor control system $P_e$ is obtained from the electromagnetic torque, machine currents, voltage and motor parameters. The power $P_e$ may be expressed in terms of the electromagnetic torque $T_e$ as follows.

$$P_e = 3/2 (T_e \omega_m + I_d^2 R_m + I_q^2 R_m + P_{misc})$$

where $P_{misc}$ is the loss component that includes the motor core losses as well as one or more stray losses in the motor control system, $R_m$ is the motor circuit resistance that includes the motor and power circuitry resistances, and $I_d$ and $I_q$ are the d-axis and q-axis motor currents respectively. Further, $P_{loss} = I_d^2 R_m + I_q^2 R_m + P_{misc}$. Further yet, the torque may be represented in terms of the motor currents as follows.

$$T_e = \frac{3}{2}\left(K_e I_q + \frac{N_p}{2}(L_q - L_d)I_d I_q\right)$$

where $K_e$ is the motor voltage or torque constant, $N_p$ is the number of rotor poles, $L_d$ and $L_q$ are the d-axis and q-axis inductances respectively. Thus, $P_e$ may be obtained in terms of the motor currents by using the torque expression. Alternatively, the power $P_e$ may be expressed in terms of $V_d$ and $V_q$, which are the d-axis and q-axis motor voltages respectively by utilizing the motor voltage-current relationships as follows.

$$V_d = I_d R_m + \frac{N_p}{2}\omega_m L_q I_q$$

$$V_q = I_q R_m - \frac{N_p}{2}\omega_m L_d I_d + K_e \omega_m$$

If the limit is met, the current commands are held for forwarding to the current regulator 150 as the commands $I_{d,final}^*$ and $I_{q,final}^*$, as shown at 450. If the limit is not met, the current commands are recalculated using the feedback loop as described herein, to adjust the torque factor k, as shown at 550.

Figure 7:
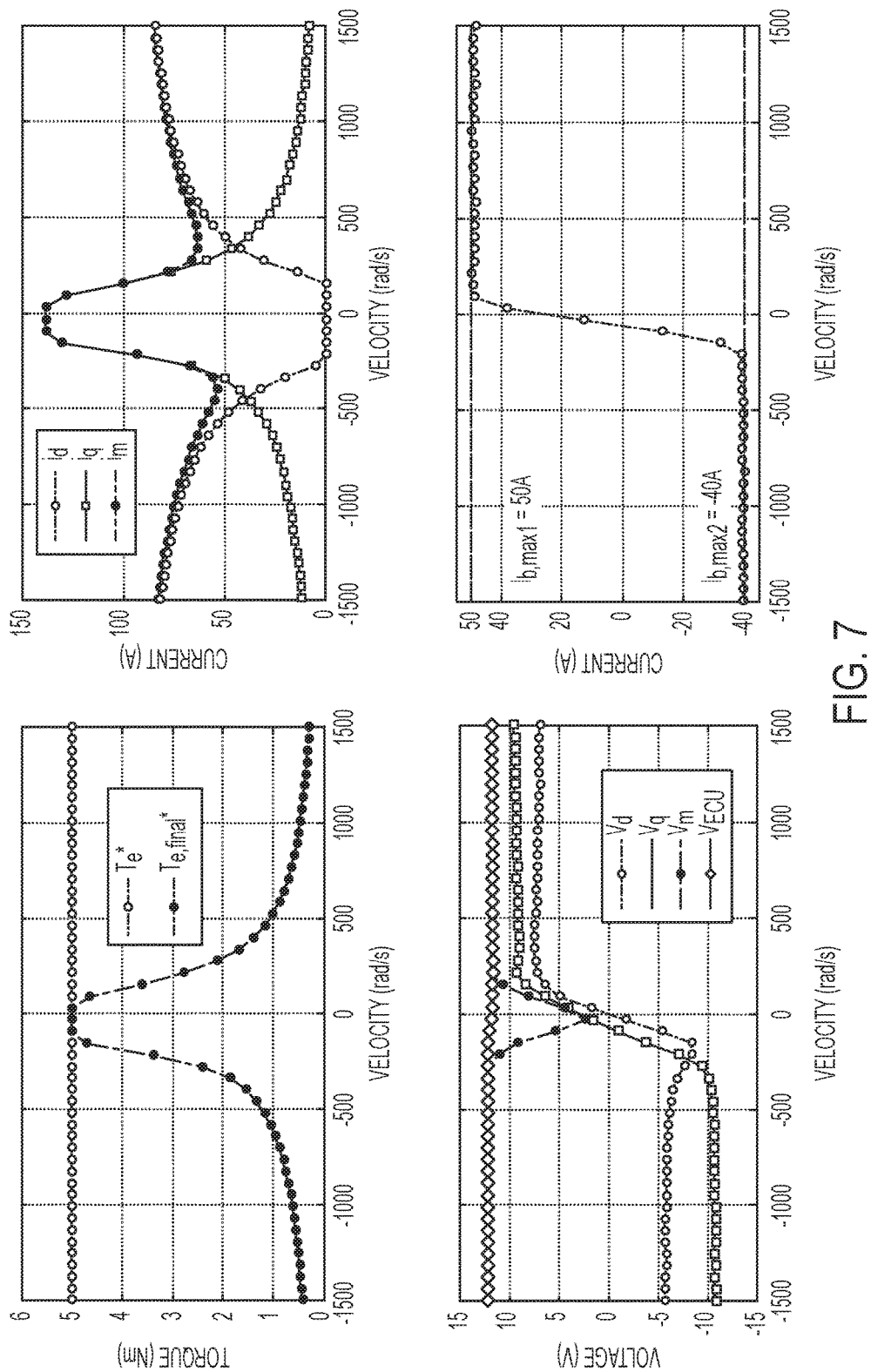
FIG. 7 depicts example results for an example motor control system implementing supply and regenerative currents limiting described herein.
Figure 8:
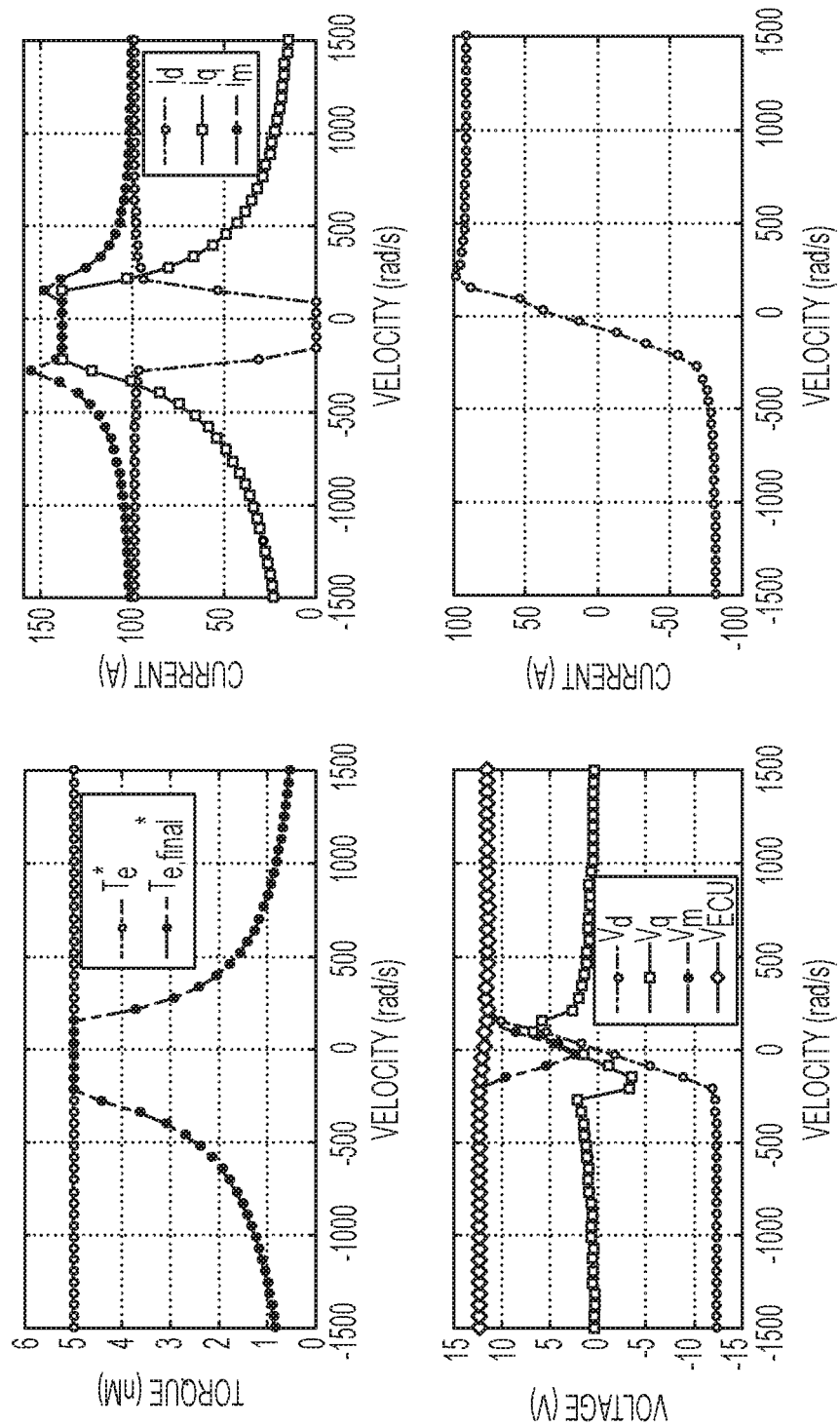
FIG. 8 depicts example results for the example motor control system without implementing supply and regenerative currents limiting described herein.

FIG. 7 depicts example results for an example motor control system implementing supply and regenerative currents limiting described herein. In the example case for which the results are depicted, the supply and regenerative current limits are set to $I_{b,max1} = 50$ A and $I_{b,max2} = -40$ A, respectively. Further, FIG. 8 depicts example results for the example motor control system without implementing supply and regenerative currents limiting described herein.

It can be seen from FIG. 7 that both supply and regenerative currents are successfully limited within the maximum values. Compared to the final torque command $T_{e,final}^*$ in FIG. 8 (without battery current limiting), the $T_{e,final}^*$ in FIG. 7 (with the limiting) is modified to generate new current commands when the limiting of the supply and regenerative currents is integrated into the PMSM control algorithm. This modified $T_{e,final}^*$ is calculated according to given battery current limits based on power conservation principle and is iteratively updated through the feedback loop until the current limits constraint is met, as described herein. Both motor current and motor voltage are changed due to the modified torque command, which are also shown in FIG. 7 and FIG. 8. The results demonstrate the effectiveness of the limiting for both supply current and regenerative currents. It should be noted that these results are an example, and that in one or more examples, using different case specific parameters and factors, the results may vary.

The technical solutions described herein thus facilitate power management (limiting) of a motor, particularly by limiting supply and regenerative currents given various constraints and requirements. The technical solutions described herein can be used for applying supply and regenerative current constrains for PMSM machines irrespective of operating conditions, and not restricted to specific operating conditions such as regenerative currents only, non-salient pole only. Further, the technical solutions described herein facilitate applying the limiting of the supply and regenerative currents in a dynamic manner, by adjusting the limits dynamically, rather than the limits being calibrated in an offline manner. Further, the technical solutions described herein ensure maximum voltage utilization throughout all PMSM operation regions under given battery current limiting constraints.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A system comprising:
    a permanent magnet synchronous motor (PMSM); and
    a motor control system configured to limit supply current and regenerative current, the motor control system being configured to:
        receive a torque command and generate a corresponding current command for generating an amount of torque based on the torque command;
        determine an estimated battery current that is drawn corresponding to the current command for the PMSM; and
        in response to the estimated battery current corresponding to the current command for the PMSM exceeding a threshold:
            generate a modified torque command;
            generate a modified current command corresponding to the modified torque command; and
            send the modified current command to cause the PMSM to generate the amount of torque.

2. The system of claim 1, further comprising a feedback current regulator that converts the modified current command to a voltage command for applying to the PMSM.

3. The system of claim 1, wherein the torque command is iteratively modified until the estimated battery current satisfies the threshold.

4. The system of claim 3, wherein modifying the torque command comprises modifying a torque factor k that is used to compute the torque command.

5. The system of claim 4, wherein the torque command is generated using computation $$T_e = \frac{k(V_{DC}i_b - i_b^2 R_C)}{\omega_m},$$

where $T_e$ is the torque command, k is the torque factor, $V_{DC}$ is a DC linkage voltage, $R_C$ is an input resistance of the motor control system, $\omega_m$ is a motor velocity, and $i_b$ is the battery current.

6. The system of claim 3, wherein modifying the torque command comprises decrementing the torque command by a predetermined amount.

7. The system of claim 1, wherein the threshold used to compare the estimated battery current is dynamically determined based on an operating mode of the motor control system.

8. The system of claim 1, further comprising a feedforward current controller that converts the modified current command to a voltage command for applying to the PMSM.

9. A method for limiting a supply current and regenerative current in a motor control system, the method comprising:
    receiving a torque command and generating a corresponding current command to generate an amount of torque according to the torque command;
    determining an estimated battery current that is drawn corresponding to the current command for a permanent magnet synchronous motor (PMSM); and
    in response to the estimated battery current corresponding to the current command for the PMSM exceeding a threshold:
        generating a modified torque command;
        generating a modified current command corresponding to the modified torque command; and
        sending the modified current command to cause a motor to generate the amount of torque.

10. The method of claim 9, wherein torque command is iteratively modified until the estimated battery current satisfies the threshold.

11. The method of claim 10, wherein modifying the torque command comprises modifying a torque factor k that is used to compute the torque command in each iteration.

12. The method of claim 11, wherein the torque command is computed using $$T_e = \frac{k(V_{DC}i_b - i_b^2 R_C)}{\omega_m},$$

where $T_e$ is the torque command, k is the torque factor, $V_{DC}$ is a DC linkage voltage, $R_C$ is an input resistance of the motor control system, $\omega_m$ is a motor velocity, and $i_b$ is the battery current.

13. The method of claim 10, wherein modifying the torque command comprises decrementing the torque command by a predetermined amount in each iteration.

14. The method of claim 9, wherein the threshold used to compare the estimated battery current is dynamically determined based on an operating mode of the motor control system.

15. The method of claim 14, wherein the operating mode of the motor control system is determined based on the torque command and a velocity of the motor.

16. A motor control system comprising:
 a current generation module configured to receive a torque command and generate a corresponding current command to generate an amount of torque according to the torque command;
 a battery current estimation and comparison module configured to:
  determine an estimated battery current drawing from a power supply for applying the current command;
  compare the estimated battery current with a max-threshold battery current;
  in response to the estimated battery current exceeding the max-threshold battery current, send a feedback factor for modifying the torque command; and
  in response to the estimated battery current meeting the max-threshold battery current, send the current command for generating torque; and
 a battery current pre-limiting module configured to modify the torque command using the feedback factor and send the modified torque command to the current generation module.

17. The motor control system of claim 16, wherein the torque command is iteratively modified until the estimated battery current satisfies the threshold.

18. The motor control system of claim 16, wherein the feedback factor is a torque factor k that is used to compute the torque command, and wherein the torque command is computed as $$T_e = \frac{k(V_{DC}i_b - i_b^2 R_C)}{\omega_m},$$

where $T_e$ is the torque command, k is the torque factor, $V_{DC}$ is a DC linkage voltage, $R_C$ is an input resistance of the motor control system, $\omega_m$ is a motor velocity, and $i_b$ is the battery current.

19. The motor control system of claim 16, wherein the max-threshold battery current used to compare the estimated battery current is dynamically determined based on an operating mode of the motor control system.

20. The motor control system of claim 19, wherein the operating mode of the motor control system is determined based on the torque command and a velocity of the motor, the operating mode being one of a motor mode and a generator mode.

* * * * *